T. STEBINS.
Hydraulic-Elevator.
No. 6,459. Reissued May 25, 1875.
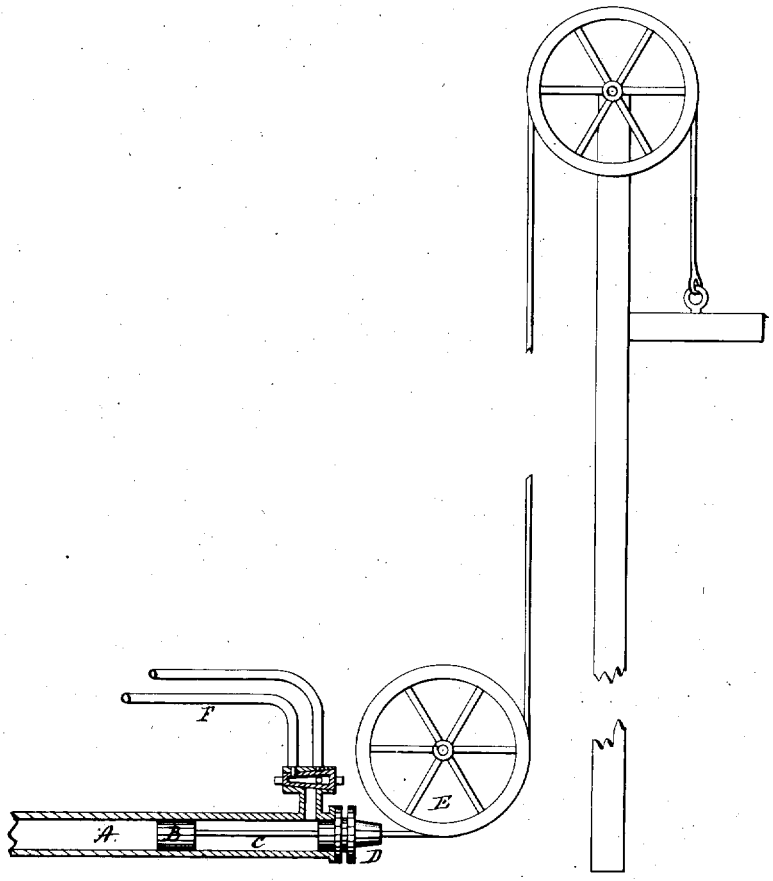
WITNESSES.
F. B. Townsend.
Nile A Moxon
INVENTOR.
Timothy Stebins
per Attys.
A. H. Evans & Co

UNITED STATES PATENT OFFICE.

TIMOTHY STEBINS, OF SAN FRANCISCO, CALIFORNIA.

IMPROVEMENT IN HYDRAULIC ELEVATORS.

Specification forming part of Letters Patent No. 139,624, dated June 3, 1873; reissue No. 6,459, dated May 25, 1875; application filed May 14, 1875.

*To all whom it may concern:*

Be it known that I, TIMOTHY STEBINS, of San Francisco city and county, State of California, have invented an Improvement in Elevators; and I do hereby declare the following description and accompanying drawings are sufficient to enable any person skilled in the art or science to which it most nearly appertains to make and use my said invention or improvement without further invention or experiment.

I am aware that elevators have been constructed with horizontal cylinders and rigid piston-rods, attached to a rope or ropes for raising the platform; but in such cases the rod is likely to be bent, and only half of the space can be utilized. In such machinery, in raising the platform a given distance, it requires twice that distance to accommodate the cylinder and the rigid piston-rod. I am also aware that vertically-arranged cylinders have been used with the rope for raising the platform attached directly to the piston; but in these cases it is evident that it is necessary to have the cylinder of the same height as the height to which the elevator is to be raised. In this case, if water is to be used as a motor, it is very difficult to get sufficient head at the top of building to operate the piston. If air is forced into the cylinder it necessitates the use of some power to operate the air-pump.

The object of my invention is to overcome these difficulties; and it consists in a combination and arrangement of a horizontal cylinder, flexible piston-rod, and pulleys, as is more fully hereinafter described.

Referring to the accompanying drawings for a more complete explanation of my invention, Figure 1 is a side elevation of my invention.

A is a cylinder, which is made of sufficient size for the amount of work which it is necessary to perform. This cylinder will lie horizontally in the cellar or other convenient place, so as to occupy as little space as possible, and to avoid the necessity of a well. In most cases two cylinders will be employed for the purpose of adjusting the power to the weight to be moved. The piston B is provided with a flexible piston-rod, C, which I prefer to make of steel wire of any suitable shape, and of a size adapted to the load. This piston passes through a stuffing-box, D. From this point the rod passes around a pulley, E, of sufficient size to allow the rod to change its direction without any permanent set or disturbance of the particles of metal. It is then carried upward to the proper height, and then passes over another pulley, from which it extends downward, and is secured to the elevator-platform, as shown. The water is admitted into the cylinder by a passage, F, and thus forces the piston to the opposite end of the cylinder, and elevates the cage, and the strain on the piston-rod is thus always a tensile one, the weight of the platform being sufficient to carry the piston to the front end of the cylinder again, when it is necessary to descend. The cocks by which the water is admitted to or discharged from the cylinder are operated by a rope at the side of the elevator in the ordinary manner, which are not shown.

By this construction I am enabled to dispense with all racks, pinions, and gears for transmitting and changing the direction of the power, and the loss by friction is thereby greatly reduced, while the machine is much simplified.

I do not claim, broadly, attaching the means of hoisting the elevator directly to the piston; but What I do claim, and desire to secure by Letters Patent, is—

The horizontal cylinder A, in combination with the flexible piston-rod C, attached directly to the piston B, and the large pulleys E and platform, arranged and operated as shown and described.

TIMOTHY STEBINS.

Witnesses:

GEO. F. BRICKETT,

A. GALLAND.